(12) United States Patent
Dhanapal et al.

(10) Patent No.: US 12,004,007 B2
(45) Date of Patent: Jun. 4, 2024

(54) MOBILE ASSISTED ENHANCEMENTS TO REDUCE RADIO RESOURCE CONTROL (RRC) SIGNALING

(71) Applicant: Apple Inc., Cupertino, CA (US)

(72) Inventors: Muthukumaran Dhanapal, Dublin, CA (US); Shravan Raghunathan, San Diego, CA (US); Sai Kiran Gummuluri, San Jose, CA (US); Hussain Ali, San Jose, CA (US); Lakshmi Kavuri, Cupertino, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/887,586

(22) Filed: Aug. 15, 2022

(65) Prior Publication Data
US 2022/0394550 A1    Dec. 8, 2022

Related U.S. Application Data

(62) Division of application No. 17/128,719, filed on Dec. 21, 2020, now Pat. No. 11,696,176.
(Continued)

(51) Int. Cl.
*H04W 74/0833* (2024.01)
*H04W 8/20* (2009.01)
(Continued)

(52) U.S. Cl.
CPC ............ *H04W 28/06* (2013.01); *H04W 8/20* (2013.01); *H04W 68/005* (2013.01);
(Continued)

(58) Field of Classification Search
CPC ..... H04W 16/28; H04W 36/08; H04W 48/12; H04W 48/14; H04W 48/16; H04W 72/23;
(Continued)

(56) References Cited

U.S. PATENT DOCUMENTS

2020/0178141 A1* 6/2020 Lee .................. H04W 48/16
2020/0344674 A1* 10/2020 Ishii ................. H04W 48/14

FOREIGN PATENT DOCUMENTS

CN          107666699 A  *  2/2018  ............ H04W 48/12

OTHER PUBLICATIONS

CN 107666699_Machine Translation (Year: 2018).*
(Continued)

*Primary Examiner* — Harun Chowdhury
(74) *Attorney, Agent, or Firm* — Eschweiler & Potashnik, LLC

(57) ABSTRACT

Techniques disclosed herein relate to reducing RRC signalling messages. Techniques can be employed to reduce the number of Random Access Channel (RACH) attempts to obtain NotBroadcasted (e.g., On Demand System Information(s) (SIs)) by a UE in response to a paging message indicating SI modification. The UE may monitor the Physical Broadcast Channel (PBCH) for a given duration in attempt to decode the On Demand SI(s) without initiating a RACH procedure. If the UE fails to decode the On Demand SI(s) within the given duration, the UE may initiate a RACH procedure to obtain the On Demand SI(s).

7 Claims, 6 Drawing Sheets

Related U.S. Application Data

(60) Provisional application No. 63/017,181, filed on Apr. 29, 2020.

(51) Int. Cl.
    *H04W 28/06*      (2009.01)
    *H04W 68/00*      (2009.01)
    *H04W 72/30*      (2023.01)
    *H04W 76/19*      (2018.01)
    *H04W 76/27*      (2018.01)
    *H04W 76/30*      (2018.01)

(52) U.S. Cl.
    CPC ....... *H04W 72/30* (2023.01); *H04W 74/0833* (2013.01); *H04W 76/19* (2018.02); *H04W 76/27* (2018.02); *H04W 76/30* (2018.02)

(58) Field of Classification Search
    CPC ....... H04W 72/30; H04W 8/20; H04W 28/06; H04W 68/005; H04W 74/0833; H04W 76/19; H04W 76/27; H04W 76/30
    USPC .......................... 370/328, 329, 336; 455/458
    See application file for complete search history.

(56) References Cited

OTHER PUBLICATIONS

"3rd Generation Partnership Project; Technical Specification Group Radio Access Network; NR; Radio Resource Control (RRC) protocol specification (Release 15)." 3GPP TS 38.331 V15.4.0 (Dec. 2018).

\* cited by examiner

MOBILE ASSISTED ENHANCEMENTS TO REDUCE RADIO RESOURCE CONTROL (RRC) SIGNALING

CROSS REFERENCE TO RELATED APPLICATIONS

This application is a Divisional of U.S. application Ser. No. 17/128,719 filed Dec. 21, 2020, which claims priority to U.S. Provisional Application No. 63/017,181 filed Apr. 29, 2020, entitled "MOBILE ASSISTED ENHANCEMENTS TO REDUCE RADIO RESOURCE CONTROL (RRC) SIGNALING", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (Rats) to enable seamless and faster wireless connectivity solutions.

DETAILED DESCRIPTION

Figure 1:
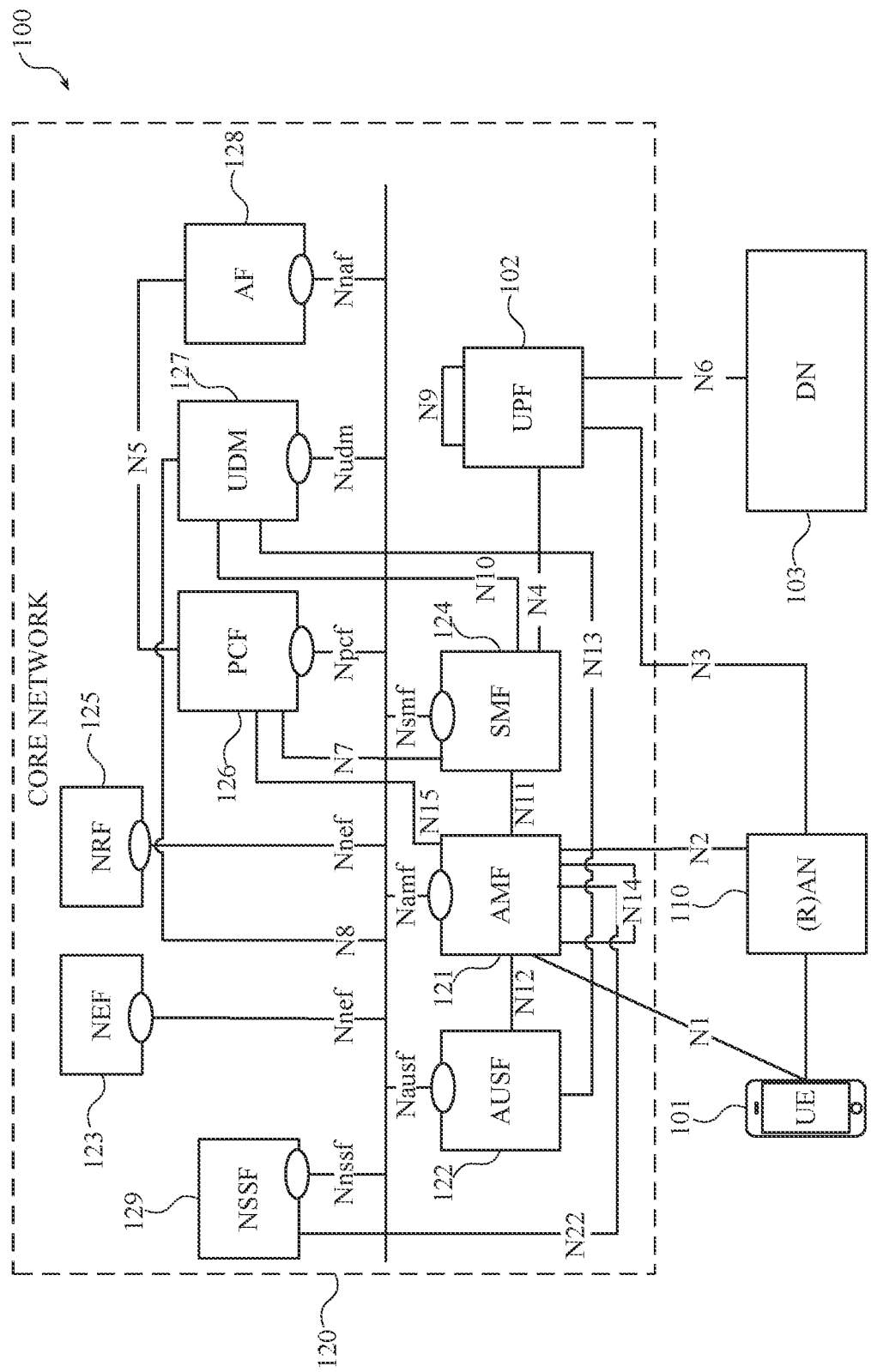
FIG. 1 is a block diagram illustrating an architecture of a system including a Core Network (CN), for example a Fifth Generation (5G) CN (5GC), in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various aspects. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 110, which can include one or more RAN nodes (e.g., Evolved Node B(s) (eNB(s)), next generation Node B(s) (gNB(s), and/or other nodes) or other nodes or access points; and a Data Network (DN) 103, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129, which can be connected by various interfaces and/or reference points, for example, as shown in FIG. 1.

Figure 2:
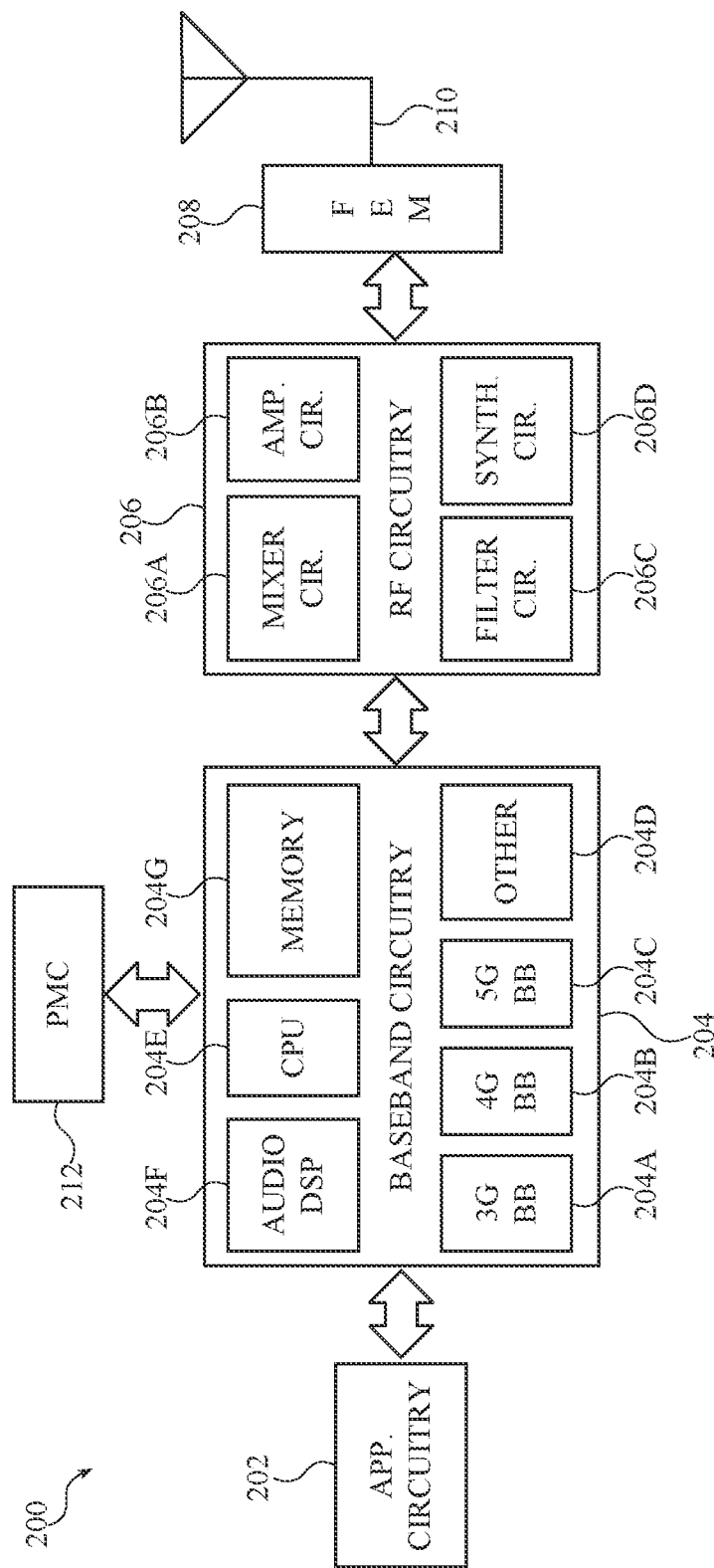
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the baseband circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
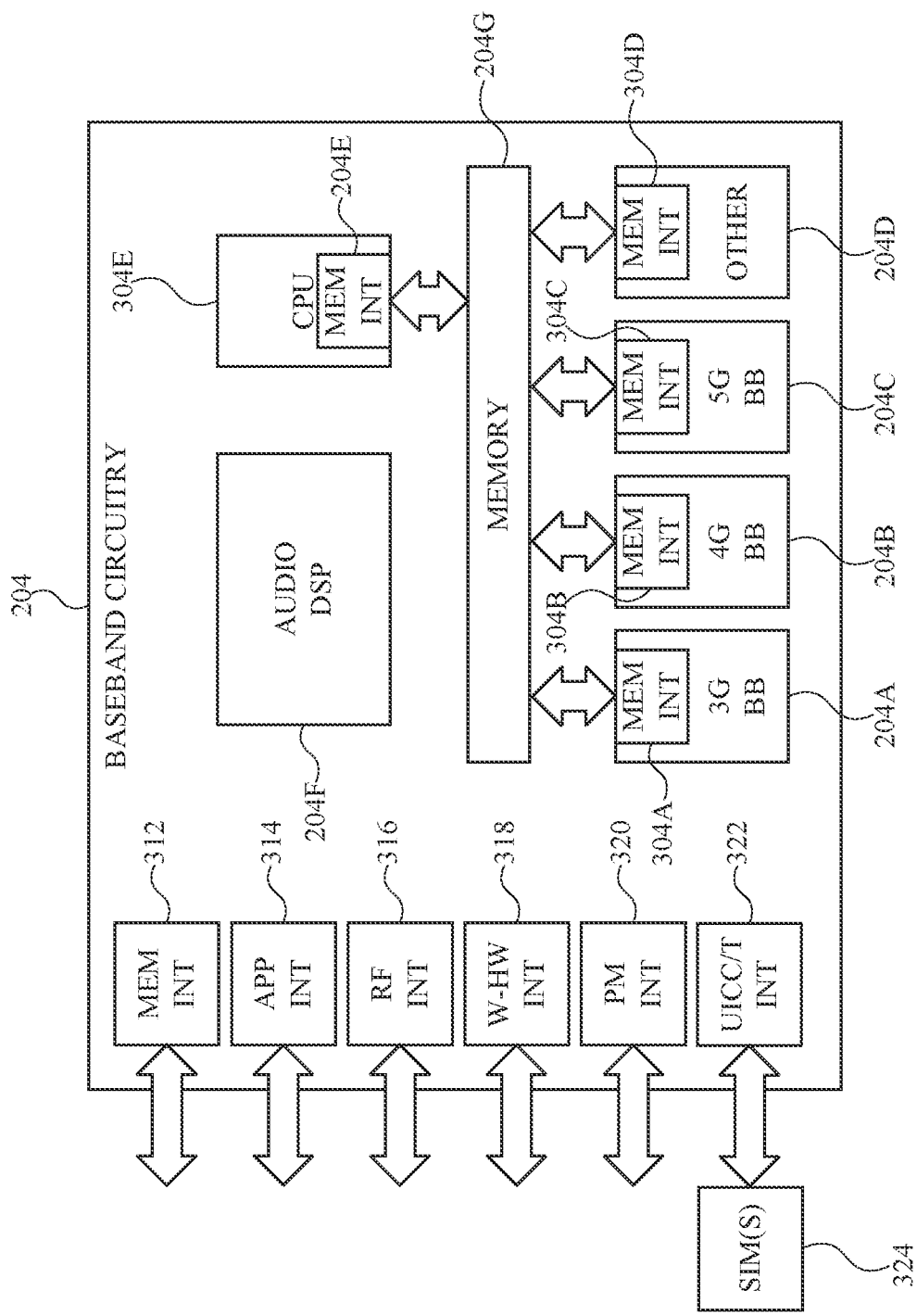
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

In various aspects, one or more baseband processor(s) 204A-204E can also interface with one or more Subscriber Identity Modules (SIMs) (e.g., which can include Universal SIMs (USIMs), etc.) 324 (which are not part of baseband circuitry 204, and can be configured to be removable from a UE such as device 200) via a UICC (UMTS (Universal Mobile Telephony System) Integrated Circuit Card)/Terminal interface 322 or similar interface. Depending on the aspects and applications, a UE can comprise one SIM or more than one SIM (e.g., at least two SIMs to be capable of operation in a Dual SIM Dual Standby or Dual Active mode, etc.), each of which can be associated with a unique International Mobile Subscriber Identity (IMSI) which can facilitate operation on one or more 3GPP networks.

As discussed in greater detail herein, various aspects, which can be employed, for example, at a UE, can facilitate a reduction in certain types of Radio Resource Control (RRC) signaling messages. Two different sets of techniques are discussed herein that can reduce RRC signaling messages, and various aspects can employ one or more of these sets of techniques. A first set of techniques can be employed to reduce RACH (Random Access Channel) requests from a RRC Idle State SIM (Subscriber Identity Module) of a UE in DSDS (Dual SIM Dual Standby) mode, wherein both SIMs can be employed through time-based multiplexing, with at most one SIM active at a time (e.g., wherein the SIMs are associated with the same and/or overlapping transceiver architecture(s)). A second set of techniques can be employed to reduce the number of RACH attempts to obtain NotBroadcasted SI(s) (System Information(s)) by a UE in response to a page message indicating SI modification.

Figure 4:
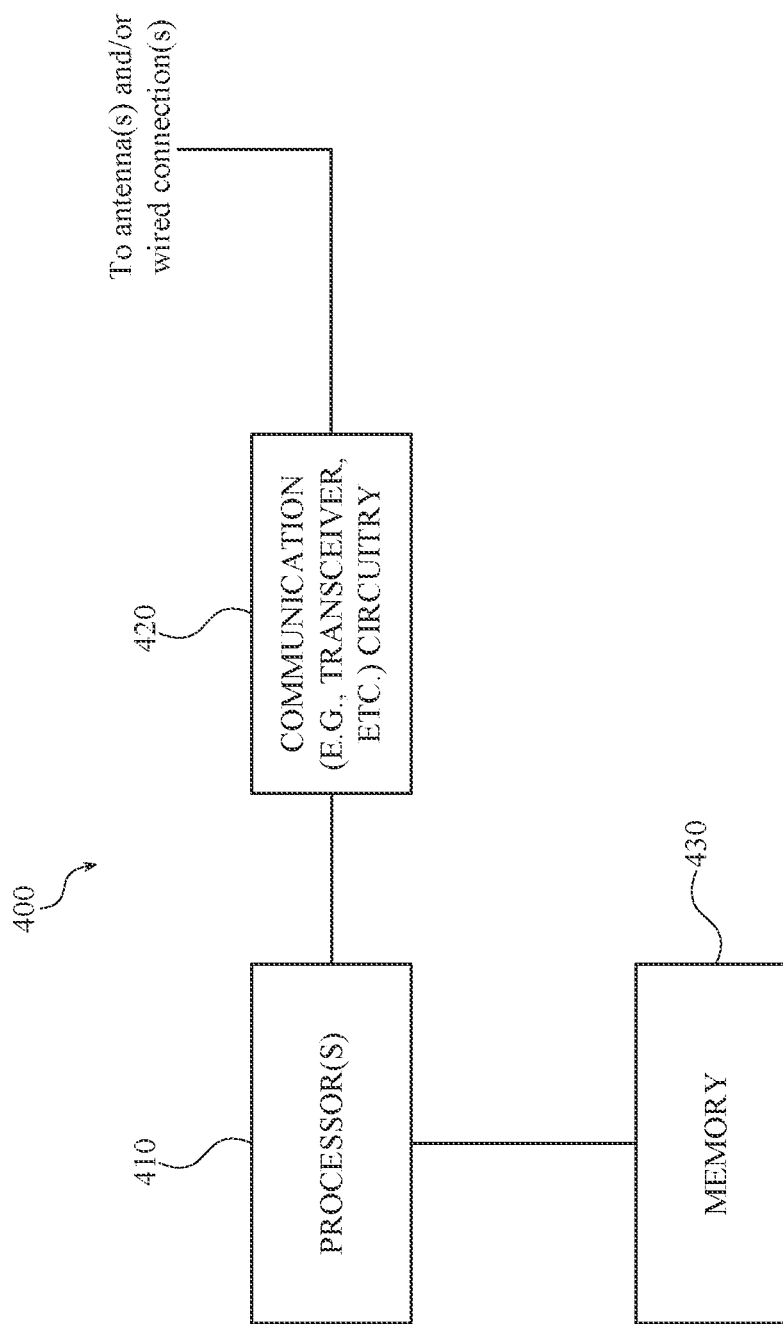
FIG. 4 is a block diagram illustrating a system that facilitates reducing Radio Resource Control (RRC) signaling from a UE in a variety of scenarios, according to various aspects discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates reducing Radio Resource Control (RRC) signaling from the UE in a variety of scenarios, according to various aspects discussed herein. System 400 can include processor(s) 410, communication circuitry 420, and memory 430. Processor(s) 410 (e.g., which can comprise one or more of application circuitry 202 and/or processors 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of aspects of system 400 (e.g., UE aspects) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{gNB}$) and network component (e.g., UPF (User Plane Function), etc.) aspects (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In aspects, signaling or messaging between different aspects of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

In 3GPP (Third Generation Partnership Project) systems, a UE can send RRC messages in the following scenarios. Various aspects can reduce (e.g., minimize or eliminate) RRC signaling via techniques discussed herein.

In a first scenario, when a UE is in DSDS (Dual SIM Dual Standby) mode and both SIMs belong to the same carrier (e.g., NW operator), in various aspects, an RRC Connected/Inactive state subscription for one of the SIMs can be used to help fetch the NotBroadcasted SIs for the other SIM when in RRC Idle state via a first set of techniques described herein, which can reduce RACH requests for the Idle state SIM.

In a second scenario, when a UE receives a page message indicating SI (System Information) modification wherein one or more NotBroadcasted (e.g., On Demand) SIs have changed, a second set of techniques discussed herein can be employed to reduce the number of RACH attempts to obtain the NotBroadcasted SI(s).

Reducing RACH Requests for an RRC Idle State SIM of a UE in DSDS Mode

A first set of techniques can reduce RACH requests for a first SIM (SIM1) without an established RRC connection (e.g., in an RRC Idle state or in an acquisition (ACQ) procedure) of a UE in DSDS mode wherein a second SIM (SIM2) of the UE is associated with the same carrier as the first SIM (e.g., and has an established RRC connection). Various aspects can employ the first set of techniques to obtain one or more On Demand SIs for the first SIM via the second SIM.

Depending on the RRC state of the second SIM, the first set of techniques can be employed in any of a variety of scenarios wherein the UE is in DSDS mode, both the first and second SIMs belong to the same carrier, and SIM1 is either in RRC Idle state or in the middle of an ACQ procedure. Depending on the RRC state of SIM2, a UE can obtain On Demand SI(s) for SIM1 via SIM2 as discussed in the following scenarios.

In some scenarios, SIM2 can be in an RRC inactive state. Depending on the specific scenario, SIM1 can be in RRC idle state and determining the On Demand SI(s) to be requested or SIM1 can be in the middle of an ACQ procedure wherein SIM would figure out the On Demand SI(s) to be requested. In either type of scenario, if SIM2 is about to initiate a RRC Resume procedure for Mobile Originated (MO)-Data and the MO-Data is not of high priority then, SIM2 can buffer the initiated RRC resume procedure, such that once SIM1 determines the On Demand SIs to be requested, the UE can request the On Demand SIs for SIM1 via SIM2 while SIM2 is in the RRC Connected state. In various aspects, the amount of time MO-data is buffered can be limited, and in some aspects can depend on the priority of the MO-data.

In other scenarios, SIM2 can be in the RRC Connected state. Again, depending on the specific scenario, SIM1 can be in RRC idle state and determining the On Demand SI(s) to be requested or SIM1 can be in the middle of an ACQ procedure wherein SIM would figure out the On Demand SI(s) to be requested. In either type of scenario, once SIM1 determines the On Demand SIs to be requested, the UE can request the On Demand SIs for SIM1 via SIM2 while SIM2 is in the RRC Connected state.

In further scenarios, SIM2 can be in RRC Connected state and the fast dormancy timer of SIM2 can be running, such that SIM2 is near the end of its RRC Connected state. Again, depending on the specific scenario, SIM1 can be in RRC idle state and determining the On Demand SI(s) to be requested or SIM1 can be in the middle of an ACQ procedure wherein SIM would figure out the On Demand SI(s) to be requested. In either type of scenario, SIM2 can buffer the initiated RRC Fast dormancy procedure, such that once SIM1 determines the On Demand SIs to be requested, the UE can request the On Demand SIs for SIM1 via SIM2 while SIM2 is in the RRC Connected state, and can then perform RRC Connection release for SIM2 due to forced Dormancy.

Figure 5:
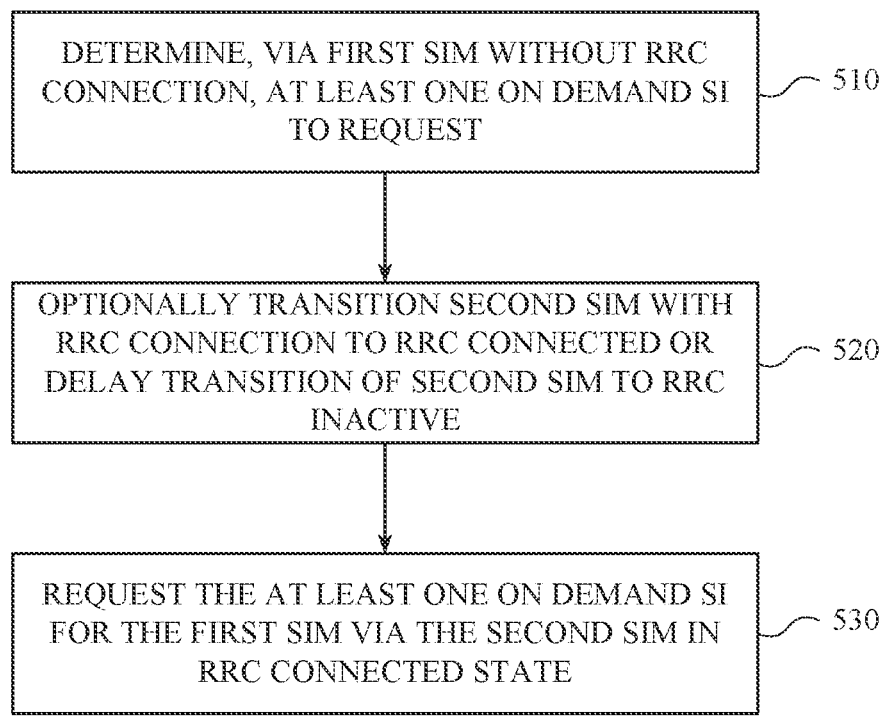
FIG. 5 is a flow diagram of an example method or process employable at a UE that facilitates reducing RACH requests from a first SIM without an established RRC connection of a UE in DSDS mode, according to various aspects discussed herein.

Referring to FIG. 5, illustrated is a flow diagram of an example method or process 500 employable at a UE that facilitates reducing RACH requests from a first SIM without an established RRC connection of a UE in DSDS mode, according to various aspects discussed herein. In other aspects, a machine readable medium can store instructions associated with method 500 that, when executed, can cause a UE (e.g., employing system $400_{UE}$) to perform the acts of method 500.

At 510, a UE can determine, via a first SIM (without an established RRC connection) of the UE, at least one On Demand SI to be requested for the first SIM.

At 520, optionally, a UE can transition a second SIM (with an established RRC connection) to a RRC Connected state or delay transition of the second SIM out of the RRC Connected state.

At 530, the UE can request the at least one On Demand SI via the second SIM while the second SIM is in the RRC Connected state.

Additionally or alternatively, method 500 can include one or more other acts described herein in connection with various aspects of a UE and/or system $400_{UE}$ and the first set of techniques.

Reducing RACH Procedures to Obtain on Demand SI(s)

A second set of techniques can reduce RACH requests for On Demand SI(s) in response to a RRC paging message indicating SI modification of the On Demand SI(s). When a UE receives a RRC paging message indicating SI Modification and the SI(s) being modified are On Demand SI(s), then, because the RRC message was a page for SI modification, all the devices in the vicinity would have been paged for SI modification.

Accordingly, in aspects employing the second set of techniques, the UE can back off initiating a RACH procedure for the On Demand SI(s) and can instead monitor the physical broadcast channel (PBCH) for a given duration (e.g., X symbols/slots/subframes/etc.) in an attempt to read the On Demand SI(s), wherein the back off/monitoring duration can be fixed (e.g., predefined, etc.) or random (e.g., based on a predefined range, etc.). If the UE cannot decode the On Demand SI(s) within the given duration then the UE can initiate the RACH procedure to obtain the On Demand SI(s).

Figure 6:
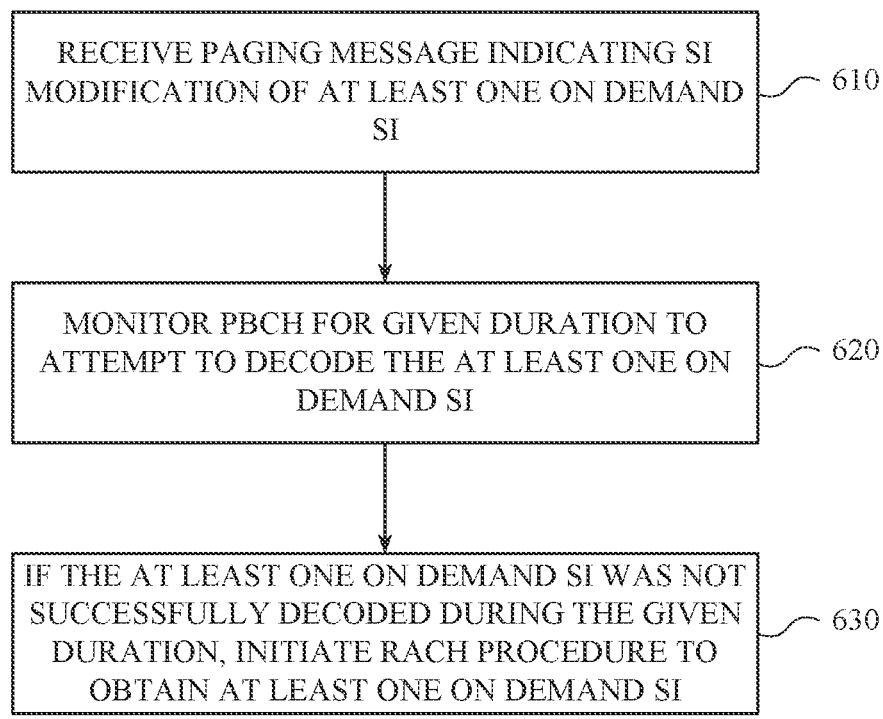
FIG. 6 is a flow diagram of an example method or process employable at a UE that facilitates reducing RACH requests to obtain On Demand SI(s) in response to a page for SI modification, according to various aspects discussed herein.

Referring to FIG. 6, illustrated is a flow diagram of an example method or process 700 employable at a UE that facilitates reducing RACH requests to obtain On Demand SI(s) in response to a page for SI modification, according to various aspects discussed herein. In other aspects, a machine readable medium can store instructions associated with method 600 that, when executed, can cause a UE (e.g., employing system $400_{UE}$) to perform the acts of method 600.

At 610, a UE can receive a paging message indicating SI modification of at least one On Demand SI.

At 620, the UE can monitor a physical broadcast channel for a given duration and attempt to decode the at least one On Demand SI.

At 630, optionally, if the at least one On Demand SI was not successfully decoded during the given duration, the UE can initiate a RACH procedure to obtain the at least one On Demand SI.

Additionally or alternatively, method 600 can include one or more other acts described herein in connection with various aspects of a UE and/or system $400_{UE}$ and the second set of techniques.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a baseband processor comprising processing circuitry configured to: determine, via a first Subscriber Identity Module (SIM) of a UE, at least one On Demand System Information (SI) for the first SIM, wherein the first SIM does not have an established Radio Resource Control (RRC) connection; and generate a request for the at least one On Demand SI via a second SIM in a RRC Connected state, wherein the first SIM and the second SIM are both associated with a common carrier.

Example 2 comprises the subject matter of any variation(s) of any of example(s) 1, wherein the first SIM is in a RRC Idle State when the at least one On Demand SI is determined for the first SIM.

Example 3 comprises the subject matter of any variation(s) of any of example(s) 1-2, wherein the first SIM is in an acquisition procedure when the at least one On Demand SI is determined for the first SIM.

Example 4 comprises the subject matter of any variation(s) of any of example(s) 1-3, wherein, when the second SIM is in an RRC Inactive state, the processing circuitry is further configured to buffer an RRC resume procedure for Mobile Originated (MO)-Data for the second SIM for a given duration to enable the second SIM to generate the request for the at least one On Demand SI via the second SIM in the RRC Connected state.

Example 5 comprises the subject matter of any variation(s) of any of example(s) 4, wherein the given duration is based at least in part on a priority of the MO-Data.

Example 6 comprises the subject matter of any variation(s) of any of example(s) 1-5, wherein the second SIM is configured to remain in the RRC Connected state throughout the determination of the at least one On Demand SI for the first SIM.

Example 7 comprises the subject matter of any variation(s) of any of example(s) 6, wherein the processing circuitry is further configured to buffer an initiated RRC Fast Dormancy procedure for the second SIM until after the request for the at least one On Demand SI is generated.

Example 8 comprises the subject matter of any variation(s) of any of example(s) 7, wherein, in response to obtaining the at least one On Demand SI for the first SIM, the one or more processors are further configured to perform a RRC Connection release for the second SIM.

Example 9 is a baseband processor comprising processing circuitry configured to: process a Radio Resource Control (RRC) paging message that indicates a System Information (SI) Modification for at least one On Demand SI; monitor, in response to the RRC paging message, a Physical Broadcast Channel (PBCH) for a given duration; and attempt to decode the at least one On Demand SI from the PBCH during the given duration.

Example 10 comprises the subject matter of any variation(s) of any of example(s) 9, wherein the given duration is randomly determined.

Example 11 comprises the subject matter of any variation(s) of any of example(s) 9, wherein the given duration is fixed.

Example 12 comprises the subject matter of any variation(s) of any of example(s) 9, wherein, in response to the at least one On Demand SI not being successfully decoded during the given duration, the processing circuitry is further configured to initiate a Random Access Channel (RACH) procedure to obtain the at least one On Demand SI.

Example 13 is a method, comprising: determining, via a first Subscriber Identity Module (SIM) of the UE, at least one On Demand System Information (SI) for the first SIM, wherein the first SIM does not have an established Radio Resource Control (RRC) connection; and generating a request for the at least one On Demand SI via a second SIM in a RRC Connected state, wherein the first SIM and the second SIM are both associated with a common carrier.

Example 14 comprises the subject matter of any variation(s) of any of example(s) 13, wherein the first SIM is in a RRC Idle when the at least one On Demand SI is determined for the first SIM.

Example 15 comprises the subject matter of any variation(s) of any of example(s) 13-14, wherein the first SIM is in an acquisition procedure when the at least one On Demand SI is determined for the first SIM.

Example 16 comprises the subject matter of any variation(s) of any of example(s) 13-15, further comprising, when the second SIM is in an RRC Inactive state, buffering an RRC resume procedure for Mobile Originated (MO)-Data for the second SIM for a given duration to enable the second SIM to generate the request for the at least one On Demand SI via the second SIM in the RRC Connected state.

Example 17 comprises the subject matter of any variation(s) of any of example(s) 16, wherein the given duration is based at least in part on a priority of the MO-Data.

Example 18 comprises the subject matter of any variation(s) of any of example(s) 13-17, wherein the second SIM is configured to remain in the RRC connected state throughout the determination of the at least one On Demand SI for the first SIM.

Example 19 comprises the subject matter of any variation(s) of any of example(s) 18, further comprising buffering an initiated RRC Fast Dormancy procedure for the second SIM until after the request for the at least one On Demand SI is generated.

Example 20 comprises the subject matter of any variation(s) of any of example(s) 19, further comprising, in response to obtaining the at least one On Demand SI for the first SIM, performing a RRC Connection release for the second SIM.

Example 21 is a method, comprising: processing a Radio Resource Control (RRC) paging message that indicates a System Information (SI) Modification for at least one On Demand SI; monitoring, in response to the RRC paging message, a Physical Broadcast Channel (PBCH) for a given duration; and attempting to decode the at least one On Demand SI from the PBCH during the given duration.

Example 22 comprises the subject matter of any variation(s) of any of example(s) 21, wherein the given duration is randomly determined.

Example 23 comprises the subject matter of any variation(s) of any of example(s) 21, wherein the given duration is fixed.

Example 24 comprises the subject matter of any variation(s) of any of example(s) 21-23, further comprising, in response to the at least one On Demand SI not being successfully decoded during the given duration, initiating a Random Access Channel (RACH) procedure to obtain the at least one On Demand SI.

Example 25 is a User Equipment (UE), comprising: first and second Subscriber Identity Modules (SIMs); and one or more processors configured to: determine, via the first SIM, at least one On Demand System Information (SI) for the first SIM, wherein the first SIM does not have an established Radio Resource Control (RRC) connection; and generate a request for the at least one On Demand SI via the second SIM in a RRC Connected state, wherein the first SIM and the second SIM are both associated with a common carrier.

Example 26 comprises the subject matter of any variation(s) of any of example(s) 25, wherein the first SIM is in a RRC Idle state when the at least one On Demand SI is determined for the first SIM.

Example 27 comprises the subject matter of any variation(s) of any of example(s) 25-26, wherein the first SIM is in an acquisition procedure when the at least one On Demand SI is determined for the first SIM.

Example 28 comprises the subject matter of any variation(s) of any of example(s) 25-27, wherein, when the second SIM is in an RRC Inactive state, the one or more processors are further configured to buffer an RRC resume procedure for Mobile Originated (MO)-Data for the second SIM for a given duration to enable the second SIM to generate the request for the at least one On Demand SI via the second SIM in the RRC Connected state.

Example 29 comprises the subject matter of any variation(s) of any of example(s) 28, wherein the given duration is based at least in part on a priority of the MO-Data.

Example 30 comprises the subject matter of any variation(s) of any of example(s) 25-29, wherein the second SIM is configured to remain in the RRC Connected state throughout the determination of the at least one On Demand SI for the first SIM.

Example 31 comprises the subject matter of any variation(s) of any of example(s) 30, wherein the one or more processors are further configured to buffer an initiated RRC Fast Dormancy procedure for the second SIM until after the request for the at least one On Demand SI is generated.

Example 32 comprises the subject matter of any variation(s) of any of example(s) 31, wherein, in response to obtaining the at least one On Demand SI for the first SIM, the one or more processors are further configured to perform a RRC Connection release for the second SIM.

Example 33 is a User Equipment (UE), comprising: one or more processors configured to: process a Radio Resource Control (RRC) paging message that indicates a System Information (SI) Modification for at least one On Demand SI; monitor, in response to the RRC paging message, a Physical Broadcast Channel (PBCH) for a given duration; and attempt to decode the at least one SI from the PBCH during the given duration.

Example 34 comprises the subject matter of any variation(s) of any of example(s) 33, wherein the given duration is randomly determined.

Example 35 comprises the subject matter of any variation(s) of any of example(s) 33, wherein the given duration is fixed.

Example 36 comprises the subject matter of any variation(s) of any of example(s) 33-25, wherein, in response to the at least one On Demand SI not being successfully decoded during the given duration, the one or more processors are further configured to initiate a Random Access Channel (RACH) procedure to obtain the at least one On Demand SI.

Example 37 comprises an apparatus comprising means for executing any of the described operations of examples 1-36.

Example 38 comprises a machine readable medium that stores instructions for execution by a processor to perform any of the described operations of examples 1-36.

Example 39 comprises an apparatus comprising: a memory interface; and processing circuitry configured to: perform any of the described operations of examples 1-36.

Example 40 comprises a User Equipment (UE) configured to execute any of the described operations of examples 1-36.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A method to be performed by a User Equipment (UE), comprising:
   receiving a Radio Resource Control (RRC) paging message from a base station that indicates a System Information (SI) modification for at least one On Demand SI;
   in response to the RRC paging message, monitoring a broadcast channel for a given duration without initiating a Random Access Channel (RACH) procedure to obtain the at least one On Demand SI, wherein the given duration begins upon receiving the RRC paging message;
   attempting to decode the at least one On Demand SI from the broadcast channel during the given duration; and
   if the On Demand SI is not successfully decoded during the given duration, initiating the RACH procedure with the base station to obtain the at least one On Demand SI.

2. The method of claim 1, wherein the given duration is randomly determined within a predefined range.

3. The method of claim 1, wherein the given duration is predefined.

4. The method of claim 1, further comprising:
   if the On Demand SI is successfully decoded during the given duration, back off initiating the RACH procedure with the base station to obtain the at least On Demand SI.

5. An apparatus for a User Equipment (UE), comprising:
   one or more processors configured to:
   receive a Radio Resource Control (RRC) paging message from a base station that indicates a System Information (SI) modification for at least one On Demand SI;
   monitor, in response to the RRC paging message, a broadcast channel for a given duration for receiving the at least one On Demand SI, without sending a request to the base station for the at least one On Demand SI during the given duration, wherein the given duration begins upon receiving the RRC paging message;
   attempt to decode the at least one On Demand SI from the broadcast channel during the given duration; and
   if the at least one On Demand SI is not successfully decoded during the given duration, send a request to the base station for the at least one On Demand SI.

6. The apparatus of claim 5, wherein the given duration is randomly determined within a predefined range.

7. The apparatus of claim 5, wherein the given duration is predefined.

* * * * *